United States Patent [19]
Pinnell et al.

[11] Patent Number: 5,828,743
[45] Date of Patent: Oct. 27, 1998

[54] APPARATUS AND METHOD FOR AUTOMATED AUDIO TELECONFERENCING HAVING ENHANCED ACCESS AND SECURITY FEATURES

[75] Inventors: William E. Pinnell, Auburndale; James H. Campbell, IV, Winter Haven, both of Fla.

[73] Assignee: Protel, Inc., Lakeland, Fla.

[21] Appl. No.: 439,587

[22] Filed: May 12, 1995

[51] Int. Cl.$^6$ .......................... H04M 15/00; H04M 3/42; H04M 3/56

[52] U.S. Cl. .......................... 379/204; 370/62; 379/202; 379/203; 379/204; 379/205

[58] Field of Search .......................... 370/62, 260, 261, 370/263; 379/202, 203, 204, 205, 206, 215, 67, 88, 89, 113, 114, 115, 133, 121

[56] References Cited

U.S. PATENT DOCUMENTS

| | | | |
|---|---|---|---|
| 3,660,610 | 5/1972 | Hestad et al. | 379/203 |
| 4,455,455 | 6/1984 | Little | 379/203 |
| 4,475,189 | 10/1984 | Herr et al. | 370/62 |
| 4,481,383 | 11/1984 | Madon | 379/204 X |
| 4,544,804 | 10/1985 | Herr et al. | 379/204 |
| 4,577,065 | 3/1986 | Frey et al. | 379/204 |
| 4,635,251 | 1/1987 | Stanley et al. | 370/261 |
| 4,796,293 | 1/1989 | Blinken et al. | 379/202 |
| 5,099,510 | 3/1992 | Blinken et al. | 379/202 |
| 5,136,581 | 8/1992 | Muehrcke | 370/62 |
| 5,222,120 | 6/1993 | McLeod et al. | 379/88 |
| 5,291,548 | 3/1994 | Tsumura et al. | 379/204 |
| 5,323,445 | 6/1994 | Nakatsuka | 348/15 |
| 5,369,693 | 11/1994 | Pillet et al. | 379/203 |
| 5,369,694 | 11/1994 | Bales et al. | 379/206 |
| 5,373,549 | 12/1994 | Bales et al. | 379/93 |
| 5,381,467 | 1/1995 | Rosinski et al. | 379/113 X |
| 5,408,518 | 4/1995 | Yunoki | 379/202 X |
| 5,408,526 | 4/1995 | McFarland et al. | 379/202 |
| 5,434,906 | 7/1995 | Robinson et al. | 379/67 |
| 5,483,587 | 1/1996 | Hogan et al. | 379/203 X |
| 5,483,588 | 1/1996 | Eaton et al. | 379/204 X |
| 5,631,904 | 5/1997 | Fitser et al. | 379/205 X |

*Primary Examiner*—Harry S. Hong
*Attorney, Agent, or Firm*—Allen, Dyer, Doppelt, Milbrath & Gilchrist, P.A.

[57] ABSTRACT

An audio teleconferencing apparatus includes one or more conference bridges for establishing an audio teleconference between conference attendees, and a conference controller for controlling the conference bridges to permit a conference scheduler to reserve an audio teleconference and facilitate connection of the conference attendees during the audio teleconference. The conference controller may receive an account number of the conference scheduler via a telephone of the conference scheduler, and determine the validity of the account number. The conference controller generates an audio prompt menu at the telephone of the conference scheduler for directing the conference scheduler to input conference reservation information via the telephone responsive to a valid account number from the conference scheduler, and for reserving the audio teleconference based upon the input conference reservation information. The reservation information preferably includes a reserved date of the audio teleconference, a reserved starting time of the audio teleconference, a reserved length of the audio teleconference, and a reserved number of conference attendees for the audio teleconference. The conference controller also preferably includes code activation and deactivation features, reservation confirmation features, and reconfiguration and overbooking features. Method aspects of the invention are also disclosed.

54 Claims, 9 Drawing Sheets

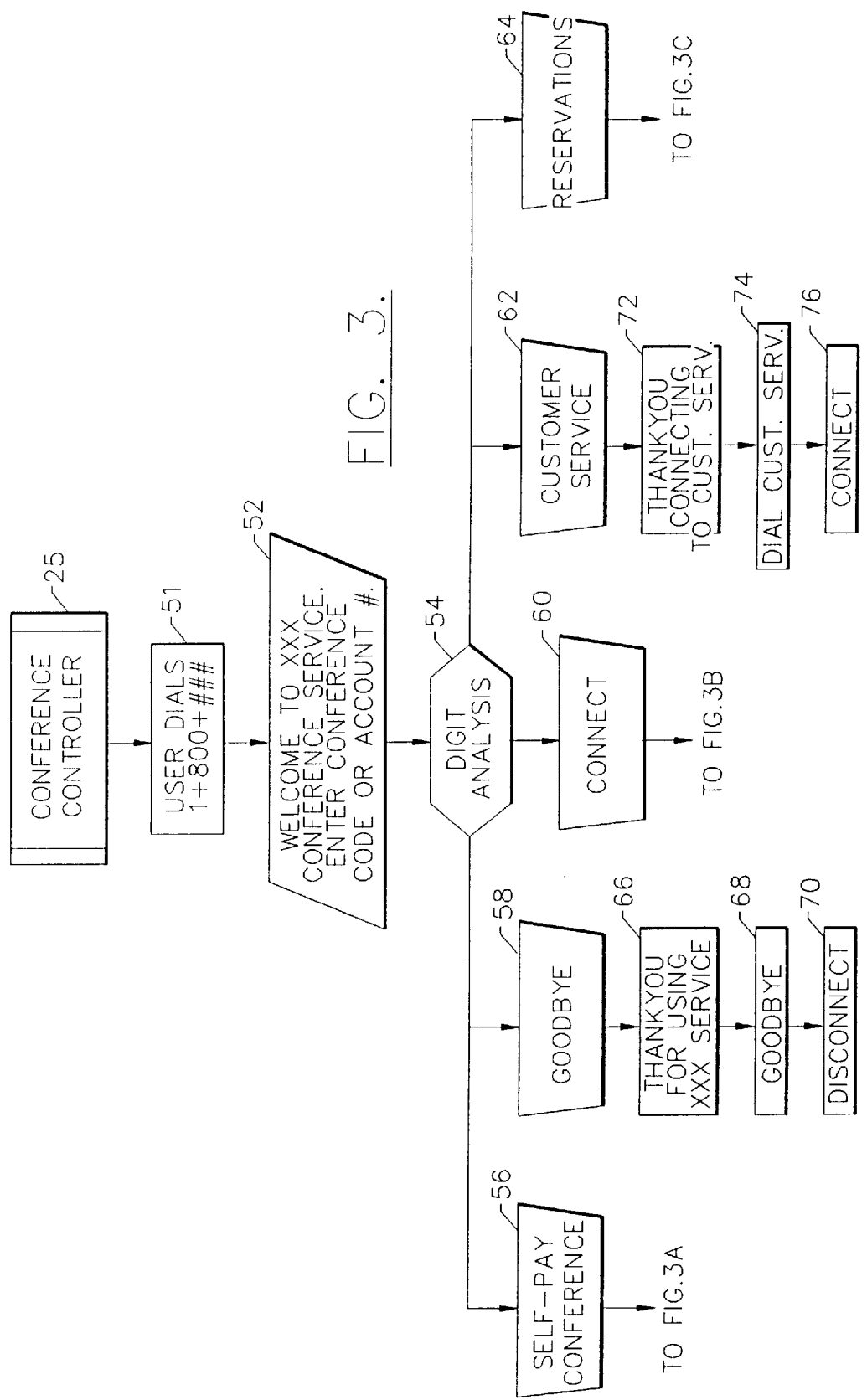

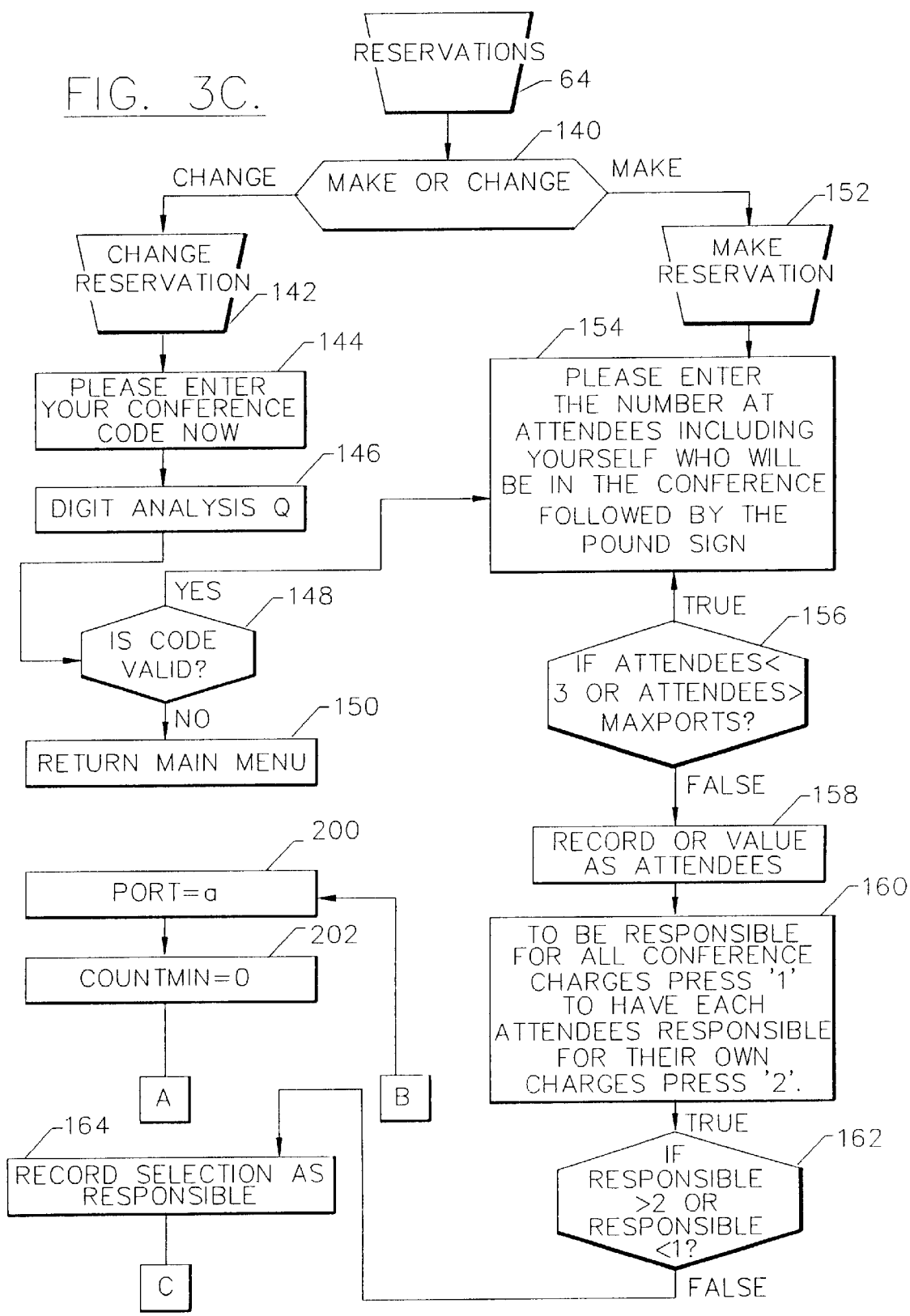

APPARATUS AND METHOD FOR AUTOMATED AUDIO TELECONFERENCING HAVING ENHANCED ACCESS AND SECURITY FEATURES

FIELD OF THE INVENTION

The invention is directed to the field of telecommunications, and, more particularly, to an apparatus and method for audio teleconferencing.

BACKGROUND OF THE INVENTION

An audio teleconference is commonly used to connect a plurality of conference attendees together at a designated time via the public switched telephone network (PSTN). An audio teleconference may be an efficient and effective way to conduct meetings and exchange information among widely separated individuals. Unfortunately, a conventional teleconference requires human operator intervention to schedule, allocate, and engage network resources for the teleconference. Accordingly, operator's time is required, billing options are relatively limited, relatively long lead times may be required for the operator to set up the conference, and flexibility to reschedule or extend a conference may also be limited.

One such conventional teleconference system and service is the Alliance Dedicated Teleconferencing Service available from AT&T which uses an operator to schedule, monitor and control a conference call through a conference bridge. "Reset", "Meet-me" and Adlib" teleconferences are available and a reservation for which must be made in advance. A "Demand" conference does not require a reservation. Also relating to the Alliance system, U.S. Pat. No. 4,769,293 to Blinken et al. discloses a service computer operatively connected between the coordinator of a conference and the dedicated teleconferencing bridge. The service computer maintains directory lists which are specific to named conferees and other information so that the coordinator need only provide the variable information responses which are specific to a desired function. The service computer combines the variable information response from the coordinator with the so-called constant information to drive the Alliance system microprocessor.

The service computer of the Alliance system also permits the transfer of notes or other textual data between conferees, requiring that each conferee also has a terminal connected to the service computer. A conference coordinator first obtains a login ID and password from the operator of the service computer. A data terminal is then used to control and monitor the conference. The service computer is also programmed to provide billing information based on the filed carrier tariffs. At the end of the conference the coordinator is provided with the billing information on his terminal. Unfortunately, a separate data channel is needed for each terminal. Similarly, U.S. Pat. No. 5,099,510 to Blinken, Jr. et al. patent also discloses a teleconferencing apparatus for voice, video or data wherein a teleconference coordinator may reserve and operate the teleconference system, but also requires a computer terminal or personal computer to do so.

U.S. Pat. Nos. 5,373,549 and 5,369,594 both to Bales et al. are directed to an improvement over the apparatus disclosed in the Blinken, Jr. et al. patent, for example, which requires a separate data line to access the service computer. The Bales et al. patents disclose station terminals connected using an ISDN line so that a separate data line is not needed. In addition, a multi-level conference call may be established according to the patent.

U.S. Pat. No. 4,475,189 to Herr et al. discloses a demand-type dial-up conference apparatus for permitting a customer to dial in, select a voice and/or data conference, and initiate the conference. The apparatus includes a tone receiver for receiving commands from the customer, and a stored speech message announcement system. In particular, the apparatus includes a NSC processor that requests an identification of the calling line and transmits an order over bus to the data store system ordering a particular message prompt to be played to the customer. This prompt would advise the customer that he is connected to a conference facility and request the customer to dial certain codes to indicate whether or not the audio bridge will be used for a special service. The prompt would also ask the originator how many parties will be included in the conference. If the number of desired dataports are available, the user is prompted to then dial the first conferee. The conference originator continues by dialing the numbers assigned to the remaining conferees until all are bridged. Should a predetermined number of errors be determined indicating user frustration, an operator is connected to assist the user. U.S. Pat. No. 4,544,804 also to Herr et al. discloses an improvement relating to transfer of control of the conference during the conference. In particular, the apparatus permits the originator to relinquish control to an operator or another conferee.

Relating to billing features of a teleconference, U.S. Pat. No. 4,481,383 is directed to billing for the AT&T demand-type teleconferencing system described above. A billing record is created, and allowances are made for establishing a reconnection or if the operator is in the conference; however, prepaid billing options are not included. The conference originator is typically charged for the entire conference service; however, billing data may be gathered on various segments of the conference call, thus making it possible to divide the cost among the conferees if one so desires.

U.S. Pat. No. 4,577,065 to Frey et al. is directed to a meet-me type teleconference wherein in one embodiment the customer contacts an operator to schedule the conference and receive the access code. An alternate embodiment discloses that a customer could directly dial a facility such as the network services complex (NSC) disclosed in the above mentioned Herr et al. patent (U.S. Pat. No. 4,475,189), and the NSC could be programmed to interact with the caller in allocating resources and announcing an access code for the meet-me conference systems to be used. In addition, the conference bridge may be selected to minimize the length of the conferee legs. The last four digits of the access code may be used to designate other criteria, such as the number of legs, special billing, etc. Also, should multiple conferees call at the same time, one call is processed while the others are temporarily halted.

U.S. Pat. No. 5,323,445 to Nakatsuka discloses a teleconferencing apparatus for users for both video and audio wherein the apparatus includes a reservation center for registering conference terminal information in a conference table at times designated in accordance with reserved conference information collected in advance for the respective conferences, thereby automatically controlling the starting and ending of each of the conferences. The reservation center includes input means, such as a keyboard for inputting of reserved conference information and display means by which the operator is informed of the reserved conference information and of the operational status of conferences being held. Along these lines, U.S. Pat. No. 4,455,455 to Little discloses a teleconference apparatus including a network control center with an internodal conference call administrator. The administrator has a procedure file containing data representing schedules of conference calls and access numbers to a conference bridge. An operator schedules routine commands and thus permits automation of network operation including internodal conferencing.

U.S. Pat. No. 3,660,610 to Hestad et al. discloses an apparatus for permitting a meet-me teleconference or a progressive teleconference, and which allows private conversations between the convening party and the participants. In other words, the apparatus includes a private bus and a common bus. When a convening subscriber wishes to hold a meet-me conference, he first dials the directory numbers of the other parties, and individually asks each to dial the conference feature number at a particular time. Then, at the appointed time, each of these parties so dials and gains access to the five conference port circuits. All parties are then communicatively connected together via a voice transmission bridge including the mixing busses.

In summary, an audio teleconference in particular is a very valuable communication tool for businesses and other parties. Unfortunately, conventional scheduling of a teleconference may be difficult and/or require extensive or complete operator intervention. In addition, security features and allocation of conferencing resources may be severely limited. Flexibility of scheduling and billing arrangements may also be limited, such that an extended teleconference, that is, a teleconference extending beyond the scheduled time is not facilitated without operator intervention.

SUMMARY OF THE INVENTION

In view of the foregoing background, it is therefore an object of the present invention to provide an apparatus and related method for an audio teleconference which permits ready access and reservation of the teleconference without requiring operator intervention.

It is another object of the present invention to provide an apparatus and method for an audio teleconference which provides enhanced security for the audio teleconference.

These and other objects, advantages, and features of the present invention are provided in accordance with the present invention by an apparatus including conference bridging means for establishing an audio teleconference between conference attendees, and a conference controller for controlling the conference bridging means for permitting a conference scheduler to reserve an audio teleconference and facilitating connection of conference attendees during the audio teleconference. In one embodiment, the conference controller comprises access means for receiving an account number of the conference scheduler via a telephone of the conference scheduler, and access validating means for determining validity of the account number of the conference scheduler. The validation may be based upon comparison to a table of valid account numbers. In addition, the access validating means may comprise security means for preventing a second caller from accessing the reservation means using a same otherwise valid account number being used by the first caller.

In addition, the conference controller preferably includes reservation means for generating an audio prompt menu at the telephone of the conference scheduler for directing the conference scheduler to input conference reservation information via the telephone responsive to a valid account number from the conference scheduler, and for reserving the audio teleconference based upon the input conference reservation information. The reservation means preferably includes menu means for generating audio prompts relating to a reserved date of the audio teleconference, a reserved starting time of the audio teleconference, a reserved length of the audio teleconference, and a reserved number of conference attendees for the audio teleconference. In addition, the controller may further comprise reservation confirmation means for generating a series of audio prompts relating to the reservation information, and for receiving confirmation regarding the reservation information from the conference scheduler via the telephone of the conference scheduler.

The reservation means preferably further comprises allocating means for determining availability of conference bridging means based upon first reservation information from the conference scheduler, and for generating audio prompts for directing the conference scheduler to input second or alternate reservation information if resources are not available based upon the first reservation information.

Yet another aspect of the reservation means is that a overbooking means may be provided to permit selection of a predetermined amount of overbooking of conference bridge resources, such as based upon patterns of usage. Accordingly, the conference bridge ports will not remain idle for those teleconferences which are reserved, but do not take place.

The conference controller preferably further includes conference code generating means for generating a conference code and communicating the conference code to the conference scheduler via the telephone of the conference scheduler. Accordingly, the conference scheduler may communicate the conference code to the other conference attendees to thereby permit the conference attendees to join the reserved audio teleconference at the designated date and time. Conference operating means of the conference controller preferably cooperates with the conference bridging means for permitting connection of telephones of the conference attendees during the audio telephone conference and responsive to receipt of the conference code from each conference attendee.

To enhance security and efficiency of the audio teleconferencing apparatus of the invention, the conference controller also preferably includes conference code activation means cooperating with conference operating means for permitting connection of telephones of the conference attendees only within a predetermined time related to a reserved starting time for the audio teleconference. In addition, the conference controller may further comprise conference code deactivation means cooperating with the reservation means for deactivating the conference code if a predetermined time has passed since the reserved starting time for the audio teleconference and if the teleconference has not been started. Accordingly, the ports of the conference bridges may be quickly reused if the audio teleconference does not occur thereby avoiding otherwise idle time. The controller may also include scheduler conference deactivating means for permitting the conference scheduler to cancel the reserved audio teleconference by deactivating the conference code prior to the audio teleconference.

Another aspect of the invention relates to conference attendee options. In particular, the conference controller may include conference attendee option means for permitting a conference attendee to temporarily disconnect from the audio teleconference such as to perform any of several helpful functions. These may include adding a conference attendee, calling a party to enter the audio teleconference, adding value to an account, querying cost related information of the audio teleconference, extending a reserved length of time for the audio teleconference, removing a conference attendee, and reserving a future audio teleconference.

Other features of the present invention include means for generating an audio prompt at a telephone of a conference attendee instructing the conference attendee that the audio conference is not yet in progress if the conference attendee calls earlier than a predetermined time before a reserved starting time for the audio teleconference. The conference controller may also include reconfiguring means for dynamically allocating conference resources so that a reserved teleconference may begin a predetermined time earlier than the reserved starting time. Thus, one or more early conference attendees may begin the teleconference early by a predetermined amount of time. The reconfiguring means may also cooperate with the conference bridging means and allocate additional available resources for permitting the audio teleconference to extend beyond a reserved length of time, or to add a conference attendee during the teleconference. In addition, the reconfiguring means may permit dynamic rerouting of the audio teleconference based upon a failure of a connecting line or a failure of a conference bridge port.

Various enhanced billing features are also provided in accordance with the present invention by billing allocation means for generating audio prompts relating to billing for each conference attendee. The billing allocation means preferably includes means for permitting mixed billing between the conference attendees including at least one of post pay, post pay with credit limits, and prepay. The billing allocation means may also include means for permitting prepaid billing from one or more of the conference attendees, and means for prompting a conference attendee to add value during the audio teleconference.

Method aspects of the present invention relating to audio teleconferencing are also described in greater detail below.

BRIEF DESCRIPTION OF THE DRAWINGS

FIG. 3 is a first flow chart illustrating a first portion of operation of the apparatus according to the invention.

FIGS. 3C–3F are portions of a fourth flow chart illustrating teleconference reservation features of the apparatus according to the invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
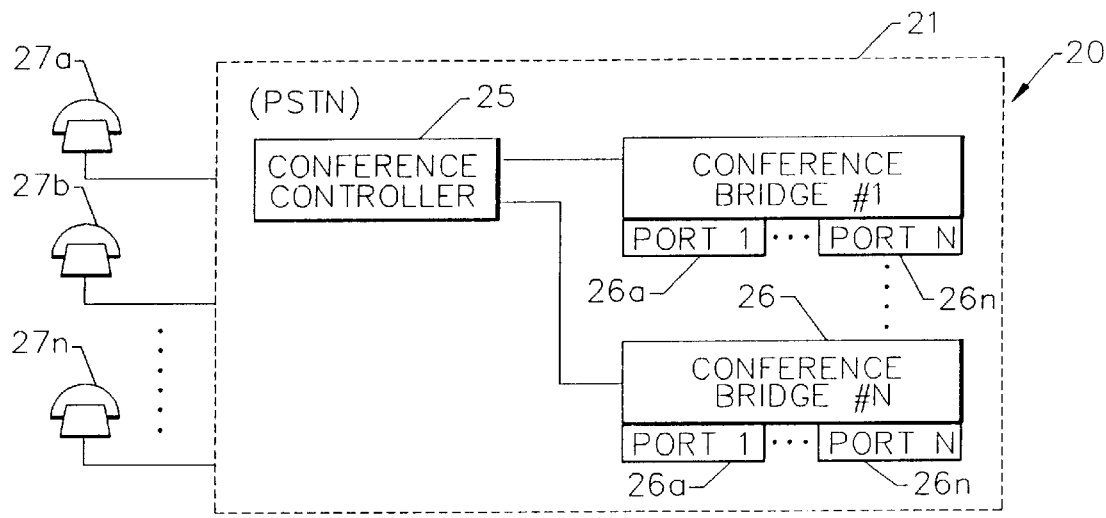
FIG. 1 is a schematic block diagram of the apparatus according to the invention.

The audio teleconferencing apparatus 20 according to the invention is first described with reference to FIG. 1. In the illustrated embodiment, the apparatus 20 includes a conference controller 25 and one or more conference bridges 26 scheduled and operated by the conference controller. Both the conference controller 25 and the conference bridges 26 may be readily incorporated into the public switched telephone network (PSTN) 21 as would be readily understood by those skilled in the art.

The conference bridge 26 may of the type including a plurality of conference ports 26a–n as manufactured and sold by AT&T. In addition, the conference bridges 26 may be widely separated over the PSTN as would also be readily understood by those skilled in the art. The one or more conference bridges 26 provide bridging means for establishing an audio teleconference between conference attendees via their respective telephones 27a–n. The conference controller 25 controls the conference bridges 26 for permitting the conference scheduler to reserve an audio teleconference via his telephone 27a and facilitates connection of the telephones 27a–n of the conference attendees during the audio teleconference.

Figure 2:
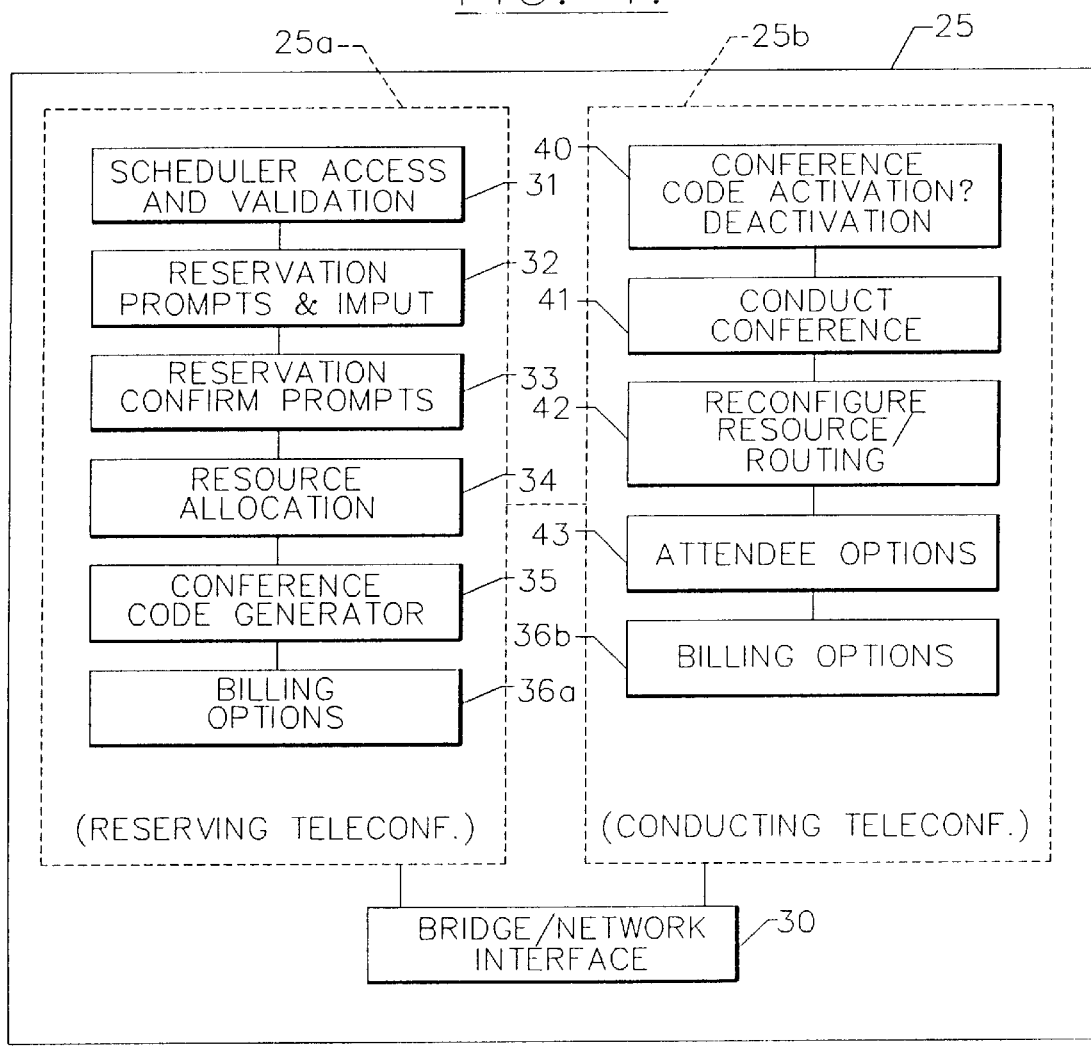
FIG. 2 is a schematic block diagram illustrating further details of the conference controller according to the invention.

Referring now additionally to the schematic block diagram of FIG. 2, the operation of the conference controller 25 is further described with reference to those features primarily used during reserving an audio teleconference set forth in the left hand dashed outline block 25a, and those features primarily used for conducting or during the audio teleconference set forth in the right hand dashed outline block 25b. In addition, the common interfacing to the PSTN including the conference bridges 26, and to the conference attendee telephones 27a–n is schematically illustrated by the bridge/network interface block 30.

In one embodiment, the conference controller 25 comprises access means for receiving an account number of the conference scheduler via the telephone 27a of the conference scheduler, and access validating means for determining validity of the account number of the conference scheduler, both of which are schematically illustrated by the scheduler access and validation block 31. The validation may be based upon comparison to a table of valid account numbers. In addition, the access validating means may comprise security means for preventing a second caller from accessing the reservation means using a same otherwise valid account number as a first caller while the first caller is accessing the conference controller. Accordingly, the security of the audio teleconferencing apparatus is enhanced, yet access is facilitated through the automated operation of the conference controller 25 and without requiring manual operator intervention.

The conference controller 25 also includes reservation means for generating an audio prompt menu at the telephone 27a of the conference scheduler for directing him to input conference reservation information via the telephone if a valid account number has been determined as illustrated by the reservation prompts and input block 32. For example, the reservation means preferably includes menu means for generating audio prompts relating to a reserved date of the audio teleconference, a reserved starting time of the audio teleconference, a reserved length of the audio teleconference, and a reserved number of conference attendees for the audio teleconference. The scheduler's response is preferably in the form of telephone digit selections which may be readily interpreted by a tone receiver within the conference controller 25 as would be readily understood by those skilled in the art. Speech recognition means may also be used to interpret responses from the telephone 27a of the conference scheduler as would also be readily understood by those skilled in the art.

To facilitate the accuracy of the reservation information, the conference controller 25 may further comprise reservation confirmation means for generating a series of audio prompts relating to the reservation information as illustrated by the reservation confirmation prompt block 33. The reservation confirmation means also preferably includes means for receiving confirmation regarding the reservation information or accepting changes from the conference scheduler via his telephone 27a.

The reservation means preferably further comprises allocating means for determining availability of one or more conference bridges 26 based upon first reservation information from the conference scheduler, and for generating audio prompts for directing the conference scheduler to input second or alternate reservation information if conference bridging resources are not available based upon the first reservation information. Once the reservation information is checked and confirmed by the conference scheduler, the conference controller 25 generates a reservation allocating the required resources schematically illustrated by the block labelled resource allocation 34.

In addition, the reservation means of the conference controller 25 also preferably includes overbooking means for permitting selection of a desired amount of overbooking of conference bridge resources. For example, it has been found that for conventional operator assisted teleconferences, overbooking on the order of 300% may be desirable since many teleconferences that are reserved do not occur for one reason or another. The overbooking means provides another way to reduce the idle time of expensive resources, such as the ports 26a of the conference bridges 26.

The conference controller 25 preferably further includes conference code generating means for generating a unique conference code and communicating the conference code to the conference scheduler via the telephone 27a of the conference scheduler as illustrated schematically by the conference code generator block 35. As would be readily understood by those skilled in the art, the conference code may be a multidigit code communicated to the conference scheduler by synthesized or recorded speech messages. Accordingly, the conference scheduler may communicate the conference code to the other conference attendees to thereby permit the conference attendees to join the reserved audio teleconference at the designated date and time.

Various billing options are also preferably implemented by the conference controller 25 during the reservation portion of operation, and as schematically illustrated by the block labelled billing options 36a. In particular, the conference scheduler may elect to pay for all participants in the audio teleconference, and may do so via a post paid account, a prepaid account, or using a debit account. The scheduler may also arrange for mixed billing wherein one or more of the conference attendees pay for their own portion of the audio teleconference cost. In addition, the ability to offer prepaid accounts is an important feature of the present invention. As would be readily understood by those skilled in the art, many permutations of mixed billing are possible and are contemplated by the present invention.

Conference operating means of the conference controller 25 preferably cooperates with the one or more conference bridges 26 for permitting connection of telephones 27a–n of the conference attendees during the audio telephone conference and responsive to receipt of the conference code from each conference attendee (block labeled conduct conference 41). To enhance security of the audio teleconference, the conference controller 25 also preferably includes conference code activation means cooperating with conference operating means for permitting connection of telephones 27a of the conference attendees only within a predetermined time related to a reserved starting time for the audio teleconference. For example, the conference code may only be usable within 30 minutes of the reserved starting time and 30 minutes after the reserved starting time. Accordingly, security is enhanced against unauthorized entry into the audio teleconference.

Another feature of the conference controller 25 is that conference code deactivation means may be provided for deactivating the conference code if a predetermined time has passed since the reserved starting time for the audio teleconference and if the teleconference has not been started. For example, 30 minutes may be selected after which the allocated or reserved ports of the one or more conference bridges 26 may be reused thereby avoiding otherwise idle time. The conference controller 25 may also include scheduler conference deactivating means for permitting the conference scheduler to cancel the reserved audio teleconference by deactivating the conference code prior to the audio teleconference. The conference code automated activation, automated deactivation, and manual deactivation means are schematically illustrated by block 40.

The conference controller 25 preferably includes reconfiguring means cooperating with the conference bridges 26 and other portions of the PSTN 21 for permitting the audio teleconference to extend beyond a reserved length of the audio teleconference if resources are available. In other words, the conference controller 25 may include routing means cooperating with the conference bridging means for monitoring progress of one or more audio teleconferences and for allocating ports 26a–n of the conference bridges 26 to facilitate one of an extended length audio teleconference, and a teleconference adding an additional conference attendee, for example. In addition, the reconfiguring means may include means for allocating resources for an early conference attendee, or permit dynamic reconfiguration of the resources based upon a failure of conference bridge port, etc. as would be readily understood by those skilled in the art. These features are schematically illustrated by block 42 labelled reconfigure resource/routing, their implementation being readily understood by those skilled in the art. Accordingly, this aspect of the invention reduces idle time for expensive conference bridge resources and permits further teleconference reservations to be accepted during one or more ongoing teleconferences.

Another aspect of the invention relates to conference attendee options schematically illustrated by block 43. In particular, the conference controller 25 may include conference attendee option means for permitting a conference attendee to temporarily disconnect from the audio teleconference such as to perform at least one of adding a conference attendee, calling a party to enter the audio teleconference, adding value to an account, querying cost related information of the audio teleconference, extending a reserved length of time for the audio teleconference, removing a conference attendee, and reserving a future audio teleconference.

Various enhanced billing features are also provided in accordance with the present invention during the audio teleconference by billing allocation means for generating audio prompts relating to billing for each conference attendee as indicated schematically by the block labelled billing options 36b. In other words, the billing allocation means preferably includes means for permitting mixed billing between the conference attendees including at least one of post pay, post pay with credit limits, and prepay. The billing allocation means may also include means for permitting prepaid billing from one or more of the conference attendees, and means for prompting a conference attendee to add value during the audio teleconference.

Another feature of the conference controller 25 according to the present invention include means for generating an audio prompt at a telephone of a conference attendee instructing the conference attendee that the audio conference is not yet in progress if the conference attendee calls earlier than a predetermined time before a reserved starting time for the audio teleconference. Regular or recurring conference calls may also be reserved using the conference controller 25 according to the invention. The conference controller 25 may also include means for permitting speed dialing to access the conference controller or enable features thereof as would be readily understood by those skilled in the art.

Referring now additionally to the flow chart of FIG. 3, features of the conference controller according to the invention are further described. In the illustrated embodiment, the user, such as the conference scheduler or conference attendee, dials a 1-800 number at Block 50. The user is greeted with a welcoming voice announcement and is prompted to enter either an account number or a conference access code at Block 52. Based upon a digit analysis at Block 54, the controller may enter one of the following modes: self-pay conference (Block 56), good bye (Block 58), connect to the audio teleconference (Block 60), connect to customer service (Block 62), or schedule or change reservations (Block 64).

If good bye is entered the users receives thank you and good bye messages at Blocks 68 and 70 and is disconnected at Block 72. If customer service is entered, the user receives a message reporting election of the customer service at Block 72. The conference controller 25 then dials customer service at Block 74 and connects the user to customer service at Block 76.

Figure 3A:
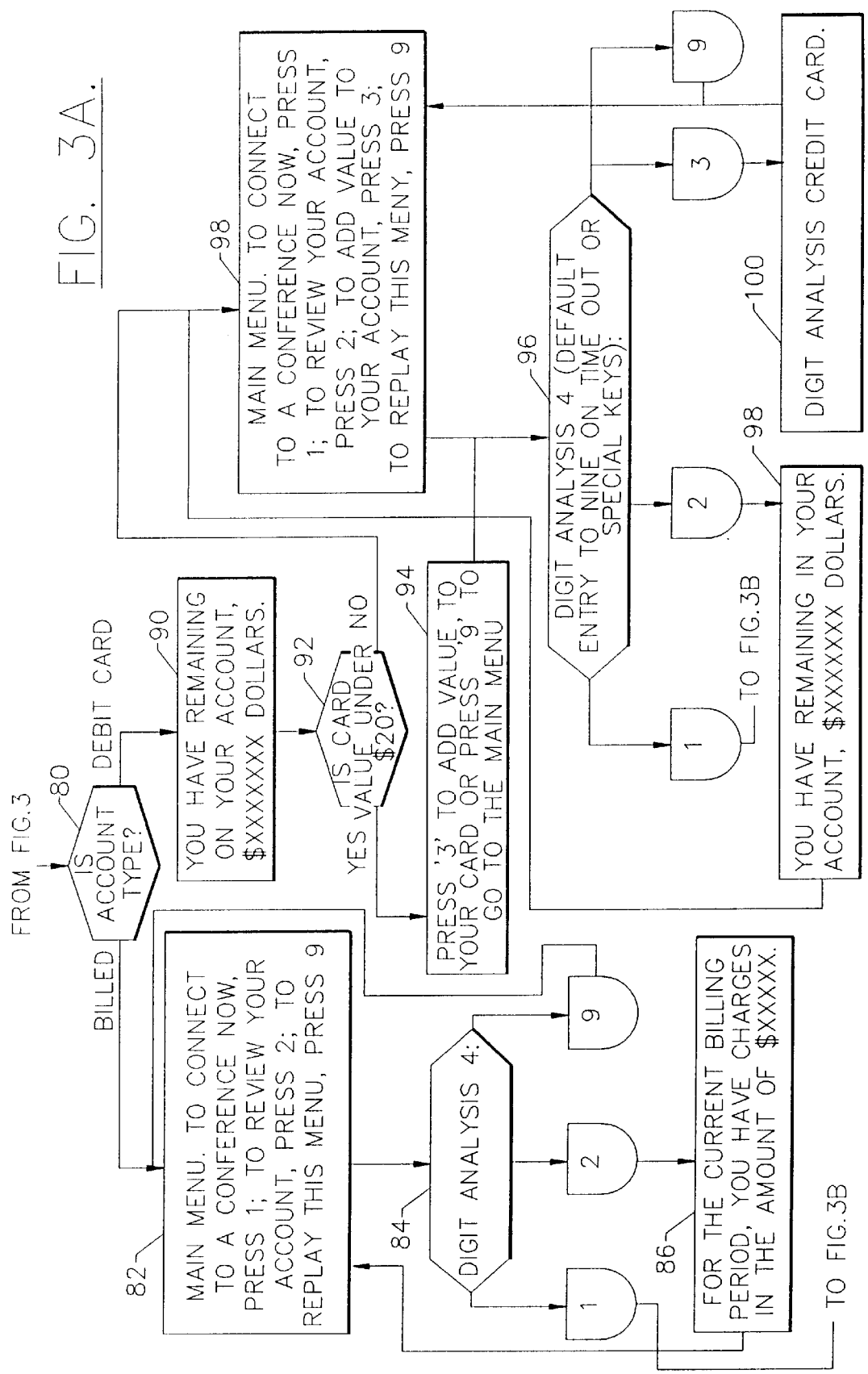
FIG. 3A is a second flow chart illustrating self-pay conference features of the apparatus according to the invention.

Referring now additionally to FIG. 3A, the self-pay conference feature is further explained. At Block 80 it is determined whether the account is a billed type or debit card type account. If it is a billed account, a menu prompts the user to press the associated digit (Block 82) and performs the requested action based upon the digit analysis of Block 84 to connect to the teleconference (Block 60 at FIG. 3), to review the account, or to replay the menu. For the billing period, the charges are communicated to the user at Block 86. If the account is a debit card, the conference controller 25 announces the amount of value remaining at Block 90. If the value is less than a predetermined amount, such as $20, determined at Block 92, the user is prompted to add value (Blocks 94 and 96). If the remaining value is greater than the predetermined amount, the user is prompted by a menu at Block 98 to announce the amount remaining (Blocks 96 and 98), to replay the menu, or to add value via a credit card at Block 100.

Figure 3B:
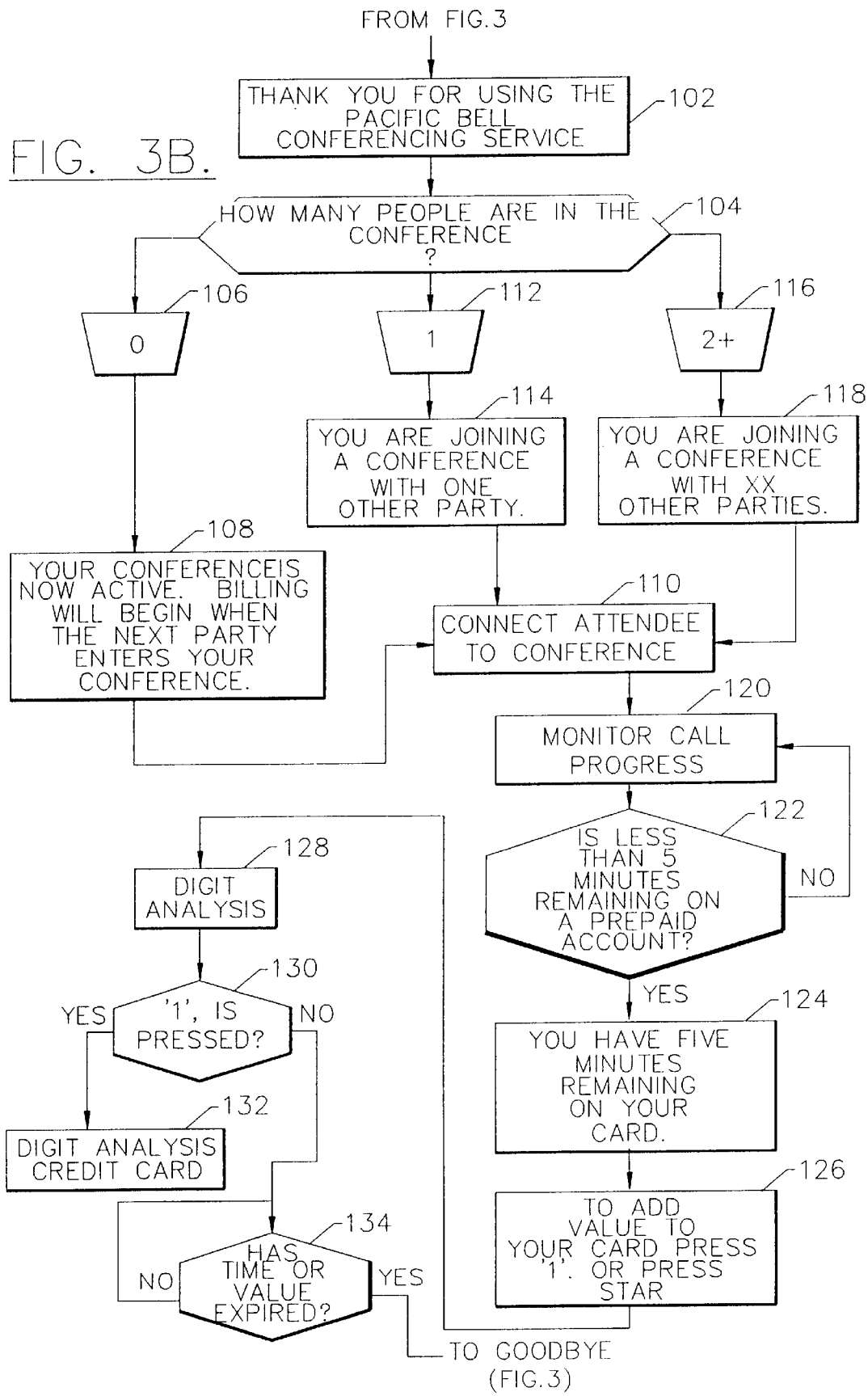
FIG. 3B is a third flow chart illustrating teleconference connecting features of the apparatus according to the invention.
Figure 3D:
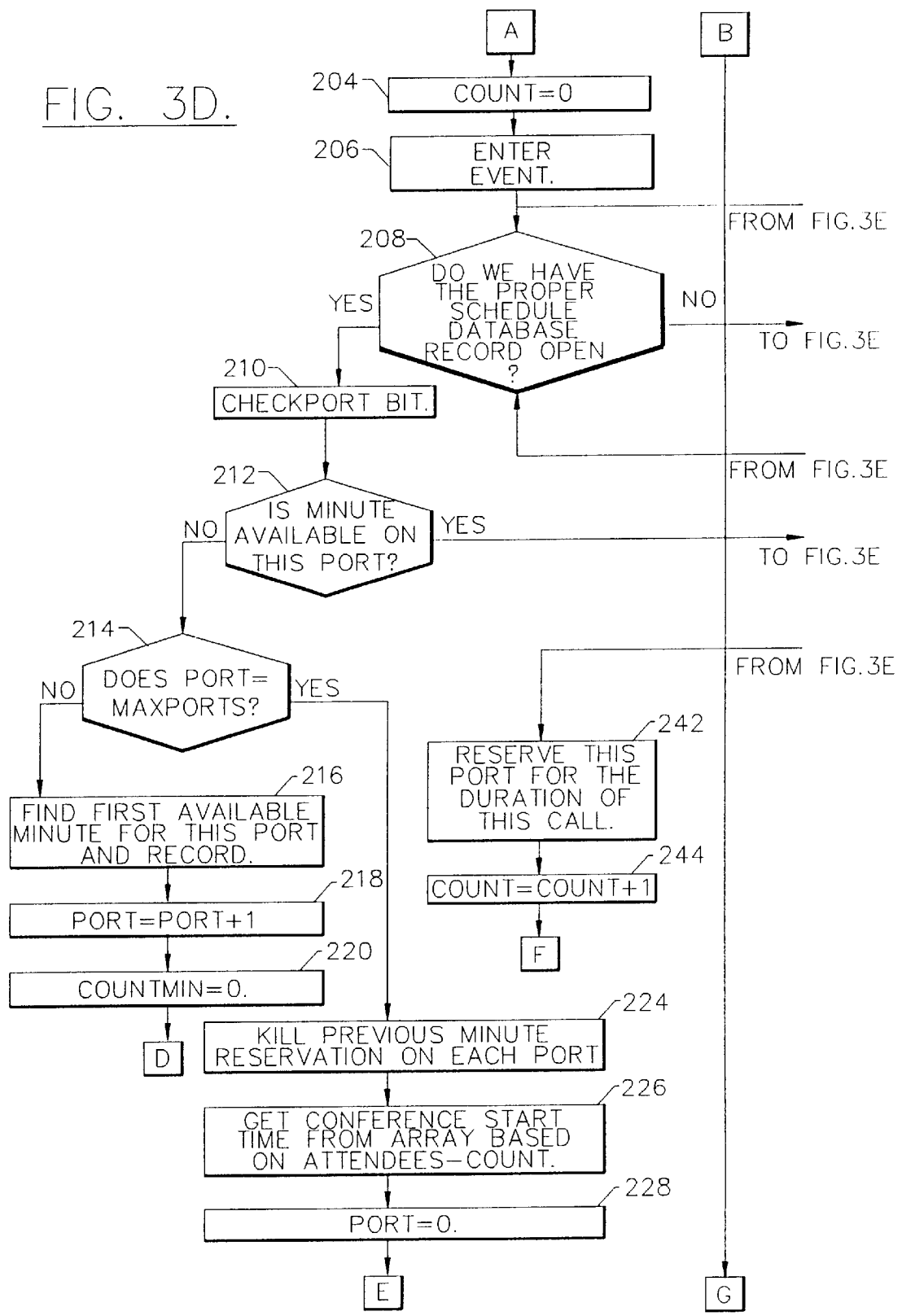
Figure 3E:
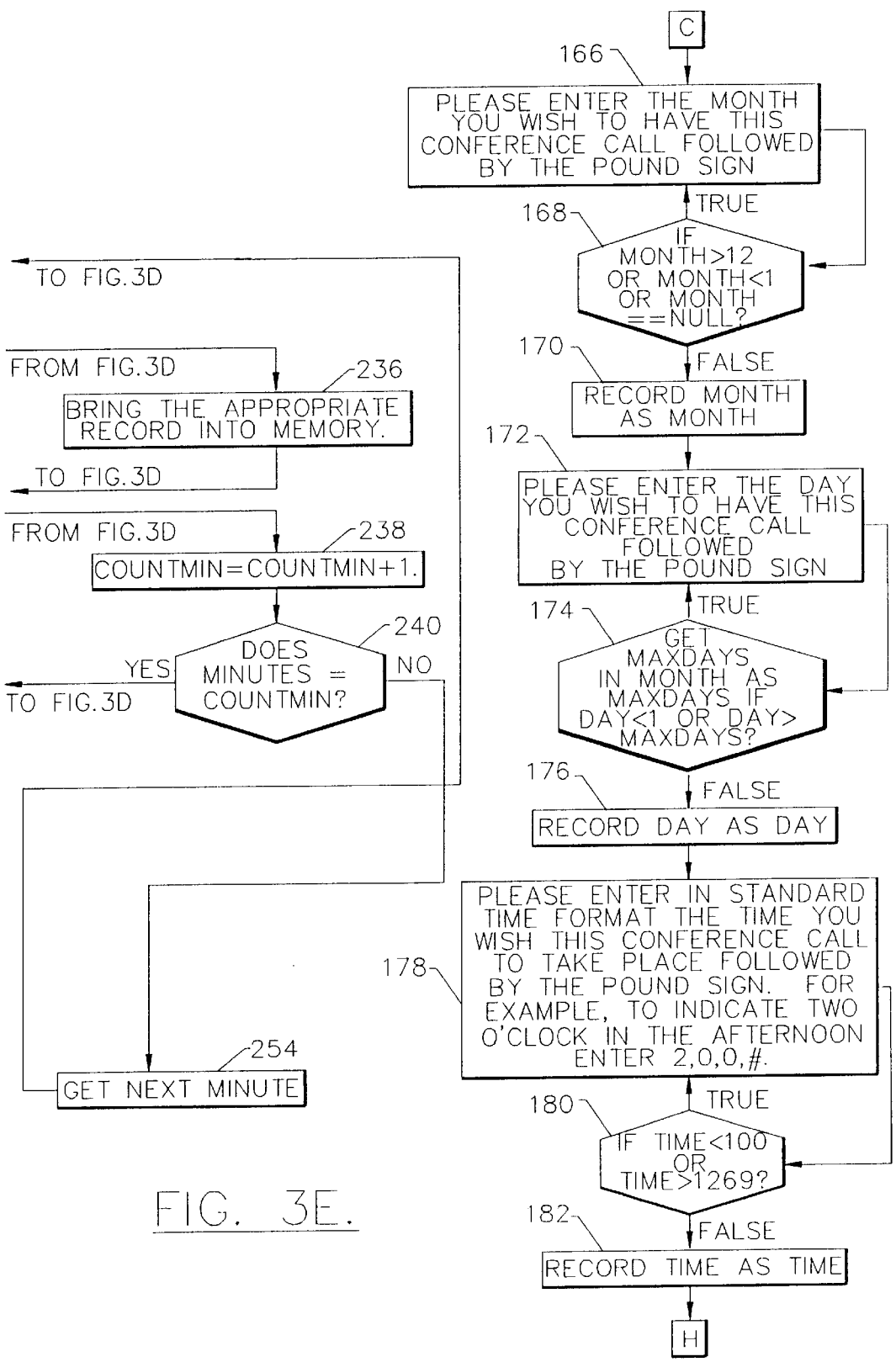
Figure 3F:
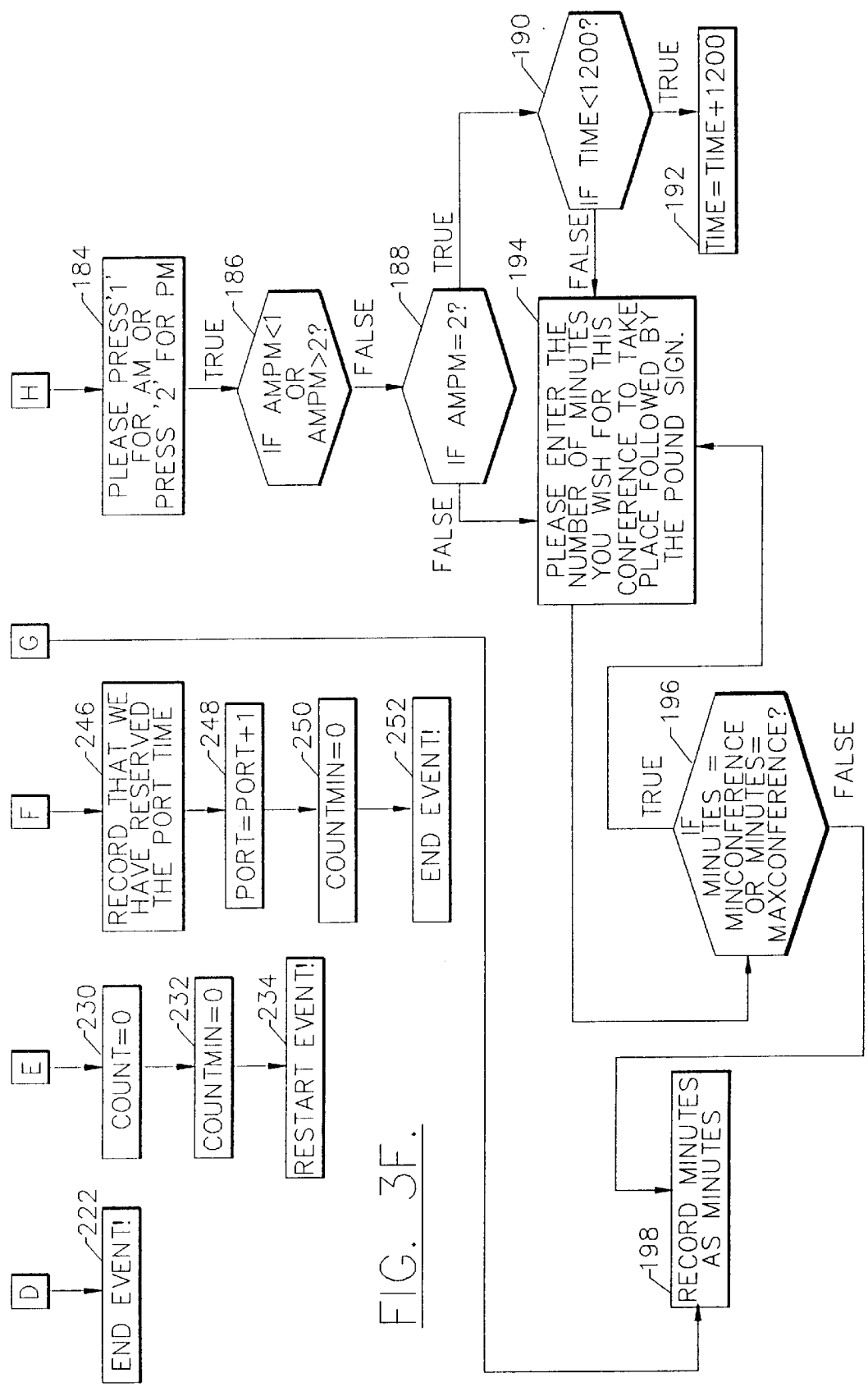

Referring now additionally to FIG. 3B, the connection to an audio teleconferene is further described. A greeting is given to the conference attendee at Block 102 followed by a prompt as to how many attendees are in the conference at Block 104. If their are no other attendees yet (Block 108), the conference is activated and billing begins when a second attendee enters. If there is one other attendee already connected, the attendee is notified at Block 114 and is connected to the conference at Block 110. If there are two or more attendees already in the conference (Block 116), the announcement as to the number of attendees is made at Block 118. The progress of the teleconference is monitored at Block 120 and if less than a predetermined time, such as the illustrated 5 minutes, is remaining on a prepaid account (Block 122), the user is prompted (Block 124) and may add value via Blocks 126, 128, and 132. If a time out is indicated at Block 134, the conference controller advances to the good bye mode (Block 58, FIG. 3).

Reservations according to the invention are further described with reference to the flow chart of FIGS. 3C–3F. The user may make or change reservations at Block 140. To change a reservation (Block 142), the user is prompted to input the conference code at Block 144, the response to which is analyzed at Blocks 146 and 148 for validity. If valid, the user proceeds to Block 154, if not, the user is returned to the main menu (Block 148). If the user selected to make a reservation at Blocks 140 and 152, the user is prompted to enter the number of conference attendees at Block 154. The number of attendees is tested at Block 156 to determine if the number is less than three or greater than a predetermined maximum number of ports. If the number of reserved attendees is within bounds at Block 156, the input number is recorded at Block 158.

The user is then prompted as to who has responsibility for billing at Block 160. The selection is tested at Block 162 and is recorded as responsible at Block 164 if so selected. The user is prompted to enter the month for the reservation at Block 166 which is again tested to determine if it is within a prescribed range (Block 168) and is recorded at Block 170. Similarly, the reserved day is requested, tested and recorded at Blocks 172, 174, and 176. Also the time format is determined and the reservation time tested and recorded at Blocks 178, 180 and 182. AM or PM designation is prompted and tested through the illustrated steps of Blocks 184, 186, 188, 190 and 192.

The reserved length of time for the audio teleconference is requested (Block 194), tested to be within a prescribed range at Block 196 and recorded at Block 198. The conference bridge ports are reserved and information recorded in a database as an event through Blocks 200, 202, 204, and 206. Whether the proper schedule database is open is determined at Block 208. If not, the appropriate record is brought into memory at Block 236 and retested. If the proper schedule database is open, the port data is checked at Blocks 210, and 212. If the minutes are not available, the number of ports is checked against the maximum number of ports at Block 214. If the answer is no at Block 214, the next available minute for the port is recorded at Block 216. The port number is incremented at Block 218, the count of minutes is set to zero at Block 220 and the event ends at Block 222.

Returning again to Block 214, if the number of ports is less than or equal to the maximum number, the previous minute reservation on each port is killed at Block 224. The conference start time from array labeled Attendees is retrieved (Block 226). The port is set to zero, the count is set to zero, the count of minutes is set to zero, and the event is restarted at Blocks 230, 232 and 234, respectively, in the illustrated embodiment.

Returning again to Block 212 if a minute is available on the port, the count of minutes is incremented at Block 238.

If the minutes is not equal to the count of minutes, a next minute is gotten at Block 254. If the minutes equals the count of minutes (Block 240) the port is reserved for the duration of the call (Block 242) and the count is incremented at Block 244. A record that the port time is reserved is made at Block 246, the port is incremented (Block 248), the count of minutes is set to zero (Block 250) and the event ended at Block 252.

Figure 4:
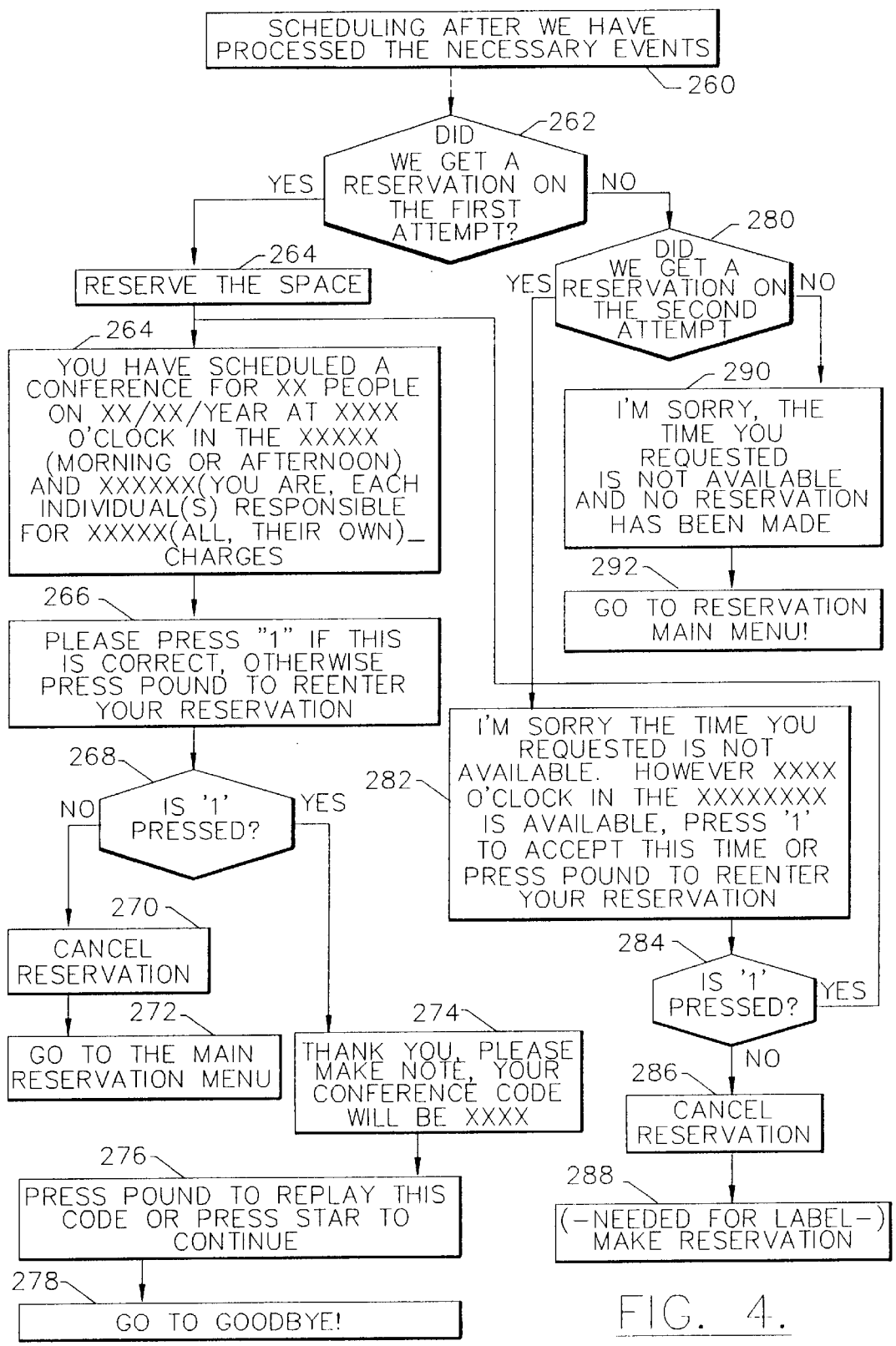
FIG. 4 is a fifth flow chart illustrating teleconference scheduling features of the apparatus according to the invention.

Referring now to the flow chart of FIG. 4 other scheduling features after the necessary events have been processed (Block 260) is described. If the reservation was obtained on the first attempt, the space is reserved at Block 264. A prompt is initiated (Block 264) indicating that the conference is scheduled for the selected number of conference attendees, for the selected date and time, and with selected billing responsibility. Confirmation of this reservation information is requested at Block 266 and determined at Block 268. If the confirmation is rejected the reservation is canceled at Block 270 and the user is returned to the main reservation menu (Block 272).

If the reservation was not obtained at Block 262, it is determined whether a reservation was obtained on a second attempt at Block 280. If the answer is yes, the user is prompted at Block 282 that the requested time is not available, that an alternate time may be available, or the reservation process may be reentered at Block 282. If the suggested alternate time is selected at Block 284 the user is returned to Block 264 for confirmation of the reservation information. If the user does not select the alternate time at Block 284, the reservation is canceled at Block 286 and the user is directed to Block 288.

Returning again to Block 280 if the reservation was not made on the second attempt, the user is prompted that no reservation has been made at Block 290. The user is then returned to the main reservation menu at Block 292.

Other features and advantages are set forth in copending patent applications: entitled "APPARATUS AND METHOD FOR AUTOMATED AUDIO TELECONFERENCING HAVING ENHANCED BILLING AND RESERVATION FEATURES" assigned to the assignee of the present invention and having attorney work docket number 95-P-9576.16; and entitled "APPARATUS AND METHOD FOR AUTOMATED AUDIO TELECONFERENCING HAVING ENHANCED RECONFIGURATION FEATURES" assigned to the assignee of the present invention and having attorney work docket number 95-P-9576.17. The disclosures of both of these copending patent applications are incorporated herein by reference in their entirety.

The illustrated embodiment of the teleconferencing apparatus 20 includes a separate conference controller 25 cooperating with one or more conferencing bridges 26 which permit multiple parties to join in the same telephone conversation on or about the reserved teleconference time. Those of skill in the art will readily appreciate that the teleconferencing apparatus according to the invention may include both controller and conferencing bridging features in one apparatus. In addition, the conference controller features according to the invention may be readily implemented by a microprocessor operating under program control as would be readily understood by those skilled in the art. Moreover, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An audio telephone conferencing apparatus permitting a conference scheduler to reserve an audio teleconference and facilitating connection of conference attendees during the audio teleconference, the apparatus comprising:

conference bridging means for establishing au audio teleconference between conference attendees; and a conference controller for controlling said conference bridging means, said conference controller comprising access means for receiving an account number of the conference scheduler via a telephone of the conference scheduler, access validating means for determining validity of the account number of the conference scheduler;

reservation means for generating an audio prompt menu at the telephone of the conference scheduler for directing the conference scheduler to input conference reservation information via the telephone and responsive to a valid account number from the conference scheduler, and for reserving the audio teleconference based upon the input conference reservation information;

billing allocation means for generating audio prompts relating to billing allocation among the conference scheduler and the conference attendees, said billing allocation means further comprising (a) means for permitting mixed billing between the conference attendees including at least one of post-pay, post-pay with credit limits and prepay, (b) means for permitting prepaid billing from one or more of the conference attendees, and (c) means for prompting a conference attendee to add value during the audio teleconference; and conference code generating means for generating a conference code and communicating the conference code to the conference scheduler via the telephone of the conference scheduler to permit the conference scheduler to communicate the conference code to the other conference attendees to thereby permit the conference attendees to join the reserved audio teleconference.

2. An apparatus according to claim 1 wherein said reservation means includes menu means for generating audio prompts relating to a reserved date of the audio teleconference, a reserved starting time of the audio teleconference, a reserved length of the audio teleconference, and a reserved number of conference attendees for the audio teleconference.

3. An apparatus according to claim 1 wherein said access validating means comprises security means for preventing a second caller from accessing the reservation means using a same otherwise valid account number as a first caller while the first caller is accessing the conference controller.

4. An apparatus according to claim 1 further comprising reservation confirmation means for generating a series of audio prompts relating to the reservation information, and for receiving confirmation regarding the reservation information from the conference scheduler via the telephone of the conference scheduler.

5. An apparatus according to claim 1 wherein said conference controller further comprises conference attendee option means for permitting a conference attendee to temporarily disconnect from the audio teleconference to permit a conference attendee to perform at least one of adding a conference attendee, calling a party to enter the audio teleconference, adding value to an account, querying cost related information of the audio teleconference, extending a reserved length of time for the audio teleconference, removing a conference attendee, and reserving a future audio teleconference.

6. An apparatus according to claim 1 wherein said reservation means further comprises allocating means for determining availability of said conference bridging means for an audio teleconference based upon first reservation information from the conference scheduler, and for generating audio prompts for directing the conference scheduler to input second reservation information if said conference bridging means is not available based upon the first reservation information.

7. An apparatus according to claim 1 wherein said reservation means further comprising overbooking means for permitting selection of a desired amount of overbooking of said conference bridging means.

8. An apparatus according to claim 1 wherein said conference controller further comprises conference operating means cooperating with said conference bridging means for permitting connection of telephones of the conference attendees during the audio telephone conference responsive to receipt of the conference code from each conference attendee.

9. An apparatus according to claim 8 wherein said conference controller further comprises conference code activation means cooperating with said conference operating means for permitting connection of telephones of the conference attendees only within a predetermined time related to a reserved starting time for the audio teleconference.

10. An apparatus according to claim 1 wherein said conference controller further comprises conference code deactivation means cooperating with said reservation means for deactivating the conference code if a predetermined time has passed since the reserved starting time for the audio teleconference and if the teleconference has not been started to thereby permit another audio teleconference.

11. An apparatus according to claim 1 further comprising scheduler conference deactivating means for permitting the conference scheduler to cancel the reserved audio teleconference by deactivating the conference code prior to the audio teleconference.

12. An apparatus according to claim 1 wherein said conference controller further comprises means for generating an audio prompt at a telephone of a conference attendee instructing the conference attendee that the audio conference is not yet in progress if the conference attendee calls earlier than a predetermined time before a reserved starting time for the audio teleconference.

13. An apparatus according to claim 1 wherein said conference controller further comprises reconfiguring means cooperating with said conference bridging means for permitting the audio teleconference to begin prior to a reserved starting time for the audio teleconference if said conference bridging means is available.

14. An apparatus according to claim 1 further comprising reconfiguring means cooperating with said conference bridging means for monitoring progress of the audio teleconference and for permitting an extension of a length of the audio teleconference if said conference bridging means is available therefor.

15. An apparatus according to claim 1 further comprising reconfiguring means cooperating with said conference bridging means for monitoring progress of the audio teleconference and for permitting addition of a conference attendee if said conference bridging means is available therefor.

16. An apparatus according to claim 1 wherein said conference bridging means includes at least one conference bridge having a plurality of ports therein.

17. A fully automated conference controller for permitting a conference scheduler to reserve an audio teleconference, facilitate connection of conference attendees during the audio teleconference and allocate charges entirely without intervention of a human operator or system administrator, said conference controller comprising:

access means for receiving an account number of the conference scheduler via a telephone of the conference scheduler;

access validating means for determining validity of the account number of the conference scheduler;

reservation means for generating an audio prompt menu at the telephone of the conference scheduler for directing the conference scheduler to input conference reservation information via the telephone and responsive to a valid account number from the conference scheduler, and for reserving the audio teleconference based upon the input conference reservation information;

billing allocation means for generating audio prompts relating to billing allocation among the conference scheduler and the conference attendees for determining responsibility of charges as between the conference scheduler and the conference attendees;

conference code generating means for generating a conference code and communicating the conference code to the conference scheduler via the telephone of the conference scheduler to permit the conference scheduler to communicate the conference code to the other conference attendees to thereby permit the conference attendees to join the reserved audio teleconference; and conference attendee option means for permitting a conference attendee to temporarily disconnect from the audio teleconference to perform at least one of adding a conference attendee, calling a party to enter the audio teleconference, adding value to an account, querying cost related information of the teleconference, extending a reserved length of time for the audio teleconference, removing a conference attendee and reserving a future audio teleconference.

18. A conference controller according to claim 17 wherein said reservation means includes menu means for generating audio prompts relating to a reserved date of the audio teleconference, a reserved starting time of the audio teleconference, a reserved length of the audio teleconference, and a reserved number of conference attendees for the audio teleconference.

19. A conference controller according to claim 17 wherein said access validating means comprises security means for preventing a second caller from accessing the reservation means using a same otherwise valid account number as a first caller while the first caller is accessing the conference controller.

20. A conference controller according to claim 17 further comprising reservation confirmation means for generating a series of audio prompts relating to the reservation information, and for receiving confirmation regarding the reservation information from the conference scheduler via the telephone of the conference scheduler.

21. A conference controller according to claim 17 wherein said reservation means further comprises allocating means for determining availability of conference resources for an audio teleconference based upon first reservation information from the conference scheduler, and for generating audio prompts for directing the conference scheduler to input second reservation information if conference resources are not available based upon the first reservation information.

22. A conference controller according to claim 17 wherein said reservation means further comprises overbooking means for permitting selection of a desired amount of overbooking of said conference bridging means.

23. A conference controller according to claim 17 further comprising conference operating means for permitting connection of telephones of the conference attendees during the audio telephone conference responsive to receipt of the conference code from each conference attendee.

24. A conference controller according to claim 17 further comprising means for generating an audio prompt at a telephone of a conference attendee instructing the conference attendee that the audio conference is not yet in progress if the conference attendee calls earlier than a predetermined time before a reserved starting time for the audio teleconference.

25. A fully automated conference controller for permitting a conference scheduler to reserve an audio teleconference, facilitate connection of conference attendees during the audio teleconference and allocate charges entirely without intervention of a human operator or system administrator, said conference controller comprising:

reservation means for generating an audio prompt menu at the telephone of the conference scheduler for directing the conference scheduler to input conference reservation information via the telephone including a reserved starting time for the audio teleconference, and for reserving the audio teleconference based upon the input conference reservation information;

billing allocation means for generating audio prompts relating to billing allocation among the conference scheduler and the conference attendees for determining responsibility of charges as between the conference scheduler and the conference attendees;

conference code generating means for generating a conference code and communicating the conference code to the conference scheduler via the telephone of the conference scheduler to permit the conference scheduler to communicate the conference code to the other conference attendees to thereby permit the conference attendees to join the reserved audio teleconference;

conference code activation means for permitting connection of telephones of the conference attendees only within a predetermined time related to the reserved starting time for the audio teleconference; and allocating means for determining availability of conference resources for an audio teleconference based upon first reservation information from the conference scheduler, and for generating audio prompts for directing the conference scheduler to input second reservation information if conference resources are not available based upon the first reservation information.

26. A conference controller according to claim 25 further comprising conference code deactivation means cooperating with said reservation means for deactivating the conference code if a predetermined time has passed since the reserved starting time for the audio teleconference and if the teleconference has not been started to thereby permit another audio teleconference.

27. A conference controller according to claim 25 further comprising scheduler conference deactivating means for permitting the conference scheduler to cancel the reserved audio teleconference by deactivating the conference code prior to the audio teleconference.

28. A conference controller according to claim 25 wherein said reservation means includes menu means for generating audio prompts relating to a reserved date of the audio teleconference, a reserved length of the audio teleconference, and a reserved number of conference attendees for the audio teleconference.

29. A conference controller according to claim 25 wherein said conference controller further comprises conference attendee option means for permitting a conference attendee to temporarily disconnect from the audio teleconference for permitting a conference attendee to perform at least one of adding a conference attendee, calling a party to enter the audio teleconference, adding value to an account, querying cost related information of the audio teleconference, extending a reserved length of time for the audio teleconference, removing a conference attendee, and reserving a future audio teleconference.

30. A conference controller according to claim 25 further comprising conference operating means for permitting connection of telephones of the conference attendees during the audio telephone conference responsive to receipt of the conference code from each conference attendee.

31. A conference controller according to claim 25 further comprising means for generating an audio prompt at a telephone of a conference attendee instructing the conference attendee that the audio conference is not yet in progress if the conference attendee calls earlier than a predetermined time before a reserved starting time for the audio teleconference.

32. A fully automated conference controller for permitting a conference scheduler to reserve an audio teleconference, facilitate connection of conference attendees during the auto teleconference and allocate charges entirely without intervention of a human operator or system administrator, said conference controller comprising:

reservation means for generating an audio prompt menu at the telephone of the conference scheduler for directing the conference scheduler to input conference reservation information via the telephone and responsive to a valid account number from the conference scheduler, and for reserving the audio teleconference based upon the input conference reservation information;

reservation confirmation means for generating a series of audio prompts relating to the reservation information, and for receiving confirmation regarding the reservation information from the conference scheduler via the telephone of the conference scheduler;

billing allocation means for generating audio prompts relating to billing allocation among the conference scheduler and the conference attendees for determining responsibility of charges as between the conference scheduler and the conference attendees;

conference code generating means for generating a conference code and communicating the conference code to the conference scheduler via the telephone of the conference scheduler to permit the conference scheduler to communicate the conference code to the other conference attendees to thereby permit the conference attendees to join the reserved audio teleconference; and wherein said reservation means includes (a) menu means for generating audio prompts relating to a reserved date of the audio teleconference, a reserved starting time of the audio teleconference, a reserved length of the audio telephone conference, and a reserved number of conference attendees for the audio telephone conference and (b) allocating means for determining availability of conference resources for an audio teleconference based upon first reservation information from the conference scheduler, and for generating audio prompts for directing the conference scheduler to input second reservation information if conference resources are not available based upon the first reservation information.

33. A conference controller according to claim 32 further comprising conference attendee option means for permitting a conference attendee to temporarily disconnect from the audio teleconference to perform at least one of adding a conference attendee, calling a party to enter the audio teleconference, adding value to an account, querying cost related information of the audio teleconference, extending a reserved length of time for the audio teleconference, removing a conference attendee, and reserving a future audio teleconference.

34. A conference controller according to claim 32 further comprising overbooking means for permitting selection of a desired amount of overbooking of said conference bridging means.

35. A conference controller according to claim 32 further comprising conference operating means for permitting connection of telephones of the conference attendees during the audio telephone conference responsive to receipt of the conference code from each conference attendee.

36. A conference controller according to claim 32 further comprising means for generating an audio prompt at a telephone of a conference attendee instructing the conference attendee that the audio conference is not yet in progress if the conference attendee calls earlier than a predetermined time before a reserved starting time for the audio teleconference.

37. A fully automated method for operating a conference controller to permit a conference scheduler to reserve an audio teleconference, facilitate connection of conference attendees during the audio teleconference and allocate charges entirely without intervention of a human operator or system administrator, the method comprising the steps of:

receiving an account number of the conference scheduler via a telephone of the conference scheduler;

determining validity of the account number of the conference scheduler;

generating an audio prompt menu at the telephone of the conference scheduler for directing the conference scheduler to input conference reservation information via the telephone responsive to a valid account number from the conference scheduler, and reserving the audio teleconference based upon the input conference reservation information;

generating audio prompts relating to billing allocation among the conference scheduler and the conference attendees for determining responsibility of charges as between the conference scheduler and the conference attendees;

generating a conference code and communicating the conference code to the conference scheduler via the telephone of the conference scheduler to permit the conference scheduler to communicate the conference code to the other conference attendees to thereby permit the conference attendees to join the reserved audio teleconference; and permitting a conference attendee to temporarily disconnect from the audio teleconference to perform at least one of adding a conference attendee, calling a party to enter the audio teleconference, adding value to an account, querying cost related information of the audio teleconference, extending a reserved length of time for the audio teleconference, removing a conference attendee and reserving a future audio teleconference.

38. A method according to claim 37 wherein the step of generating an audio prompt menu includes the step of generating audio prompts relating to a reserved date of the audio teleconference, a reserved starting time of the audio teleconference, a reserved length of the audio teleconference, and a reserved number of conference attendees for the audio teleconference.

39. A method according to claim 37 wherein the step of determining validity comprises preventing a second caller from accessing the conference controller using a same otherwise valid account number as a first caller while the first caller is accessing the conference controller.

40. A method according to claim 37 further comprising the steps of determining availability of resources for an audio teleconference based upon first conference reservation information from the conference scheduler, and generating audio prompts for directing the conference scheduler to input second reservation information if conference resources are not available based upon the first reservation information.

41. A method according to claim 37 further comprising the step of permitting connection of telephones of the conference attendees during the audio telephone conference responsive to receipt of the conference code from each conference attendee.

42. A method according to claim 37 further comprising the step of permitting the audio teleconference to extend beyond a reserved length of the audio teleconference if conference resources are available.

43. A method according to claim 37 further comprising the step of selecting a desired amount of overbooking of conference resources for the audio teleconference.

44. A fully automated method for operating a conference controller to permit a conference scheduler to reserve an audio teleconference, facilitate connection of conference attendees during the audio teleconference and allocate charges entirely without intervention of a human operator or system administrator, said conference controller comprising:

generating an audio prompt menu at the telephone of the conference scheduler for directing the conference scheduler to input conference reservation information including a reserved starting time for the audio teleconference via the telephone of the conference scheduler, and reserving the audio teleconference based upon the input conference reservation information;

generating audio prompts relating to billing allocation among the conference scheduler and the conference attendees for determining responsibility of charges as between the conference scheduler and the conference attendees;

generating a conference code and communicating the conference code to the conference scheduler via the telephone of the conference scheduler to permit the conference scheduler to communicate the conference code to the other conference attendees to thereby permit the conference attendees to join the reserved audio teleconference;

permitting connection of telephones of the conference attendees only within a predetermined time related to the reserved starting time for the audio teleconference;

deactivating the conference code if a predetermined time has passed since the reserved starting time for the audio teleconference and if the teleconference has not been started to thereby permit another audio teleconference; and generating a series of audio prompts relating to the reservation information, and receiving confirmation regarding the reservation information from the conference scheduler via the telephone of the conference scheduler.

45. A method according to claim 44 wherein the step of generating an audio prompt menu includes the step of generating audio prompts relating to a reserved date of the audio teleconference, a reserved starting time of the audio teleconference, a reserved length of the audio teleconference, and a reserved number of conference attendees for the audio teleconference.

46. A method according to claim 44 further comprising the step of permitting a conference attendee to temporarily disconnect from the audio teleconference to perform at least one of adding a conference attendee, calling a party to enter the audio teleconference, adding value to an account, querying cost related information of the audio teleconference, extending a reserved length of time for the audio teleconference, removing a conference attendee, and reserving a future audio teleconference.

47. A method according to claim 44 further comprising the steps of determining availability of conference resources for an audio teleconference based upon first reservation information from the conference scheduler, and generating audio prompts for directing the conference scheduler to input second reservation information if conference resources are not available based upon the first reservation information.

48. A method according to claim 44 further comprising the step of permitting connection of telephones of the conference attendees during the audio telephone conference responsive to receipt of the conference code from each conference attendee.

49. A method according to claim 44 further comprising the step of permitting the audio teleconference to extend beyond a reserved length of the audio teleconference if resources are available.

50. A method according to claim 44 further comprising the step of selecting a desired amount of overbooking of conference resources for the audio teleconference.

51. A fully automated method for operating a conference controller to permit a conference scheduler to reserve an audio teleconference, facilitate connection of conference attendees during the audio teleconference and allocate charges entirely without intervention of a human operator or system administrator, the method comprising the steps of:

generating an audio prompt menu at the telephone of the conference scheduler for directing the conference scheduler to input conference reservation information for the audio teleconference via the telephone of the conference scheduler, and reserving the audio teleconference based upon the input conference reservation information;

generating audio prompts relating to the reservation information input by the conference scheduler, and receiving confirmation regarding the reservation information from the conference scheduler via the telephone of the conference scheduler;

generating audio prompts relating to billing allocation among the conference scheduler and the conference attendees for determining responsibility of charges as between the conference scheduler and the conference attendees;

generating a conference code and communicating the conference code to the conference scheduler via the telephone of the conference scheduler to permit the conference scheduler to communicate the conference code to the other conference attendees to thereby permit the conference attendees to join the reserved audio teleconference;

permitting a conference attendee to temporarily disconnect from the audio teleconference to perform at least one of adding a conference attendee, calling a party to enter the audio teleconference, adding value to an account, querying cost related information of the audio teleconference, extending a reserved length of time for the audio teleconference, removing a conference attendee and reserving a future audio teleconference; and determining availability of resources for an audio teleconference based upon first reservation information from the conference scheduler, and generating audio prompts for directing the conference scheduler to input second reservation information if resources are not available based upon the first reservation information.

52. A method according to claim 51 wherein the step of generating an audio prompt menu includes the step of generating audio prompts relating to a reserved date of the audio teleconference, a reserved starting time of the audio teleconference, a reserved length of the audio teleconference, and a reserved number of conference attendees for the audio teleconference.

53. A method according to claim 51 further comprising the step of permitting connection of telephones of the conference attendees during the audio telephone conference responsive to receipt of the conference code from each conference attendee.

54. A method according to claim 51 further comprising the step of selecting a desired amount of overbooking of conference resources for the audio teleconference.

* * * * *